United States Patent
Inoue

(10) Patent No.: US 9,300,839 B2
(45) Date of Patent: Mar. 29, 2016

(54) IMAGE COMMUNICATION APPARATUS, METHOD AND A NON-TRANSITORY COMPUTER-READABLE STORAGE MEDIUM TO GENERATE BOTH IMAGE DATA BEFOREHAND FOR LOW AND HIGH SPEED FACSIMILE TRANSMISSION

(75) Inventor: Yutaka Inoue, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 665 days.

(21) Appl. No.: 13/422,073

(22) Filed: Mar. 16, 2012

(65) Prior Publication Data
US 2012/0268797 A1    Oct. 25, 2012

(30) Foreign Application Priority Data
Apr. 22, 2011    (JP) .................. 2011-095913

(51) Int. Cl.
    *H04N 1/333*    (2006.01)
(52) U.S. Cl.
    CPC ....... *H04N 1/33323* (2013.01); *H04N 1/33338* (2013.01); *H04N 1/33346* (2013.01); *H04N 1/33353* (2013.01); *H04N 1/33361* (2013.01)
(58) Field of Classification Search
    None
    See application file for complete search history.

(56) References Cited

U.S. PATENT DOCUMENTS

| 2007/0002856 A1 | 1/2007 | Aoyama et al. | |
| 2007/0177193 A1* | 8/2007 | Kumakura | 358/1.15 |
| 2008/0316543 A1* | 12/2008 | Higuchi et al. | 358/443 |
| 2009/0231603 A1* | 9/2009 | Takemoto | 358/1.9 |
| 2010/0080219 A1* | 4/2010 | Watanabe | 370/389 |

FOREIGN PATENT DOCUMENTS

| JP | 2002111952 A | 4/2002 |
| JP | 2006094024 A | 4/2006 |
| JP | 2007013445 A | 1/2007 |

OTHER PUBLICATIONS

Machine translation in english of JP Pub 2002-111952 to Kajiwara Tomohito.*
Japanese Office Action cited in Japanese counterpart application No. JP2011-095913, dated Jan. 20, 2015.

* cited by examiner

*Primary Examiner* — Benny Q Tieu
*Assistant Examiner* — Haris Sabah
(74) *Attorney, Agent, or Firm* — Rossi, Kimms & McDowell LLP

(57) ABSTRACT

An image communication apparatus enabling reduction of line occupation time and communication charge. The image communication apparatus generates image data for high-speed transmission and image data for low-speed transmission from input image data. Before transmission of image data, it is determined whether high-speed transmission of the image data is possible. When the high-speed transmission of the image data is determined to be possible, the image communication apparatus selects the image data for high-speed transmission, whereas when the same is determined to be impossible, the image communication apparatus selects the image data for low-speed transmission.

9 Claims, 11 Drawing Sheets

FIG.4

| bit | |
|---|---|
| 3 | Real-time Internet fax(ITU-TRec.T.38) |
| ⋮ | |
| 64 | Extend field |
| ⋮ | |
| 68 | JPEG coding |
| 69 | Full colour mode |
| ⋮ | |
| 104 | Extend field 5 Extend field 5 |
| 105 | 600 pels/25.4 mm x600 lines/25.4 mm |
| 106 | 1200 pels/25.4 mm x1200 lines/25.4 mm |
| 107 | 300 pels/25.4 mm x600 lines/25.4 mm |
| 108 | 400 pels/25.4 mm x800 lines/25.4 mm |
| 109 | 600 pels/25.4 mm x1200 lines/25.4 mm |
| ⋮ | |

FIG.6A

```
INVITE sip:bob@example.com SIP/2.0
Via:SIP/20/UDP pc33.xxxxx.co.jp branch=z9hG4bKnashds8
Max-Forwards:70
To:Bob⟨sip:bob@example.com⟩
From:Alicce⟨sip:alice@xxxxx.co.jp⟩;tag=1928301774
Call-ID:a81b4c76e66710@pc33.xxxxx.co.jp
CSeq:314159 INVITE
Contact:<sip:alice@pc33.xxxxx.co.jp⟩
Content-Type application/sdp
Content-Lenth:153 v=0
o=alice 53655765 2353687637 IN IP4 pc33.xxxxx.co.jp
s=-
t=0 0
```

FIG.6B

```
SIP/2.0 200 OK
Via:      SIP/2      0/UDP      tel26.example.com
5060;branch=z9hG4bKnashde0
To:Bob⟨sip:bob@example.com⟩;tag=2689387
From:Alice⟨sip:alice@xxxxx.co.jp⟩;tag=1928301774
Call-ID:a81b4c76e66710@pc33.xxxxx.co.jp
CSeq:314159 INVITE
Contact:sip:bob@tel26.xxxxx.co.jp⟩
Content-Type application/sdp
Content-Lenth:143 v=0
o=-838797679 838797679 IN IP4 tel26.example.com
s=-
t=0 0
```

FIG.8A

```
INVITE sip:bob@example.com SIP/2.0
Via:SIP/20/UDP pc33.xxxxx.co.jp branch=z9hG4bKnashds8
Max-Forwards:70
To:Bob⟨sip:bob@example.com⟩
From:Alicce⟨sip:alice@xxxxx.co.jp⟩;tag=1928301774
Call-ID:a81b4c76e66710@pc33.xxxxx.co.jp
CSeq:314159 INVITE
Contact:<sip:alice@pc33.xxxxx.co.jp⟩
Content-Type application/sdp
Content-Lenth:153 v=0
o=alice 53655765 2353687637 IN IP4 pc33.xxxxx.co.jp
s=-
t=0 0
```

FIG.8B

```
SIP/2.0 200 OK
Via:    SIP/2    0/UDP    tel26.example.com
5060;branch=z9hG4bKnashde0
To:Bob⟨sip:bob@example.com⟩;tag=2689387
From:Alice⟨sip:alice@xxxxx.co.jp⟩;tag=1928301774
Call-ID:a81b4c76e66710@pc33.xxxxx.co.jp
CSeq:314159 INVITE
Contact:sip:bob@tel26.xxxxx.co.jp⟩
Content-Type application/sdp
Content-Lenth:143 v=0
o=-838797679 838797679 IN IP4 C-T38Gateway.com
s=-
t=0 0
```

IMAGE COMMUNICATION APPARATUS, METHOD AND A NON-TRANSITORY COMPUTER-READABLE STORAGE MEDIUM TO GENERATE BOTH IMAGE DATA BEFOREHAND FOR LOW AND HIGH SPEED FACSIMILE TRANSMISSION

BACKGROUND OF THE INVENTION

1. Field of the Invention

The present invention relates to an image communication apparatus, a method of controlling the same, and a storage medium, and more particularly to a control technique for use in transmitting image data to a transmission destination by facsimile transmission according to SIP (session initiation protocol).

2. Description of the Related Art

Besides a conventional facsimile transmission technique using a public switched telephone network (PSTN), there have been proposed a facsimile transmission technique using a LAN (local area network), which enables high-speed transmission and is configured to be compatible with the facsimile transmission technique using the public switched telephone network. For example, according to ITU-T Recommendation T.38, point-to-point transmission is achieved on a LAN and hence a LAN is used as a transmission path and SIP (session initiation protocol) is used as a call control unit. For example, there has been proposed a network called the NGN (next generation network), for achieving telephone service, video communication service, and the like, using SIP. On the NGN, it is possible to provide band guarantee, phone number authentication, and so forth, to thereby perform high-speed and secure image transmission.

PSTN transmission speed is 33.6 kbps maximum, whereas the NGN guarantees a transmission speed of 1 Mbps maximum. Therefore, the NGN can realize approximately 30 times faster transmission speed. For example, the use of the NGN enables transmission of a high-definition and high-resolution image or color image, which has not been welcomed because of a long transmission time and a high communication charge, to be performed in a short time and for a small communication charge.

Further, ITU-T Recommendation T.38 is compatible with ITU-T Recommendation T.30 used on the PSTN. For this reason, transmission is possible between an image communication apparatus to which is applied ITU-T Recommendation T.38 (hereinafter referred to as "the T.38-based apparatus") and an image communication apparatus to which is applied ITU-T Recommendation T.30 (hereinafter referred to as "the T.30-based apparatus"). This transmission can be achieved by providing a T.38 gateway (GW) for interconversion between T.38 and T.30, between a LAN line, such as the NGN and the conventional PSTN.

However, the capabilities of the T.30-based apparatus are reflected on the transmission speed and hence the transmission speed cannot exceed 33.6 kbps. Transmission on a LAN between T.38-based apparatuses can be performed at a high speed for a small charge, but transmission from the T.38-based apparatus to the T.30-based apparatus cannot be performed at a transmission speed higher than 33.6 kbps, so that transmission has to be performed at a low speed for a high charge as in the prior art. Further, due to transmission performed at a low speed, the communication line is occupied, which makes it impossible to perform other transmission until the occupied state of the communication line is over.

To solve this problem, there has been proposed e.g. a technique of changing control based on whether or not transmission is to be performed between T.38-based apparatuses (see e.g. Japanese Patent Laid-Open Publication No. 2002-111952). According to this publication, in a case where facsimile transmission is performed from a T.38-based apparatus, the T.38-based apparatus detects whether a transmission destination apparatus is a T.38-based apparatus directly connected to a LAN or a T.30-based apparatus connected to the LAN via a gateway. Then, according to a result of the detection, a signal wait time period specified in T.30 or T.38 associated with a detected type of the transmission destination apparatus is selected (when the transmission destination apparatus is a gateway connected type, a longer wait time period is selected so as to compensate for a time lag that occurs when the transmission is performed via the gateway). Note that Japanese Patent Laid-Open Publication No. 2002-111952 relates only to the technique of compensating for a lag time that occurs when a gateway is interposed, to thereby stabilize communication, but it makes no mention of image control (i.e. control of image quality and a color image) to which the present invention is directed.

In a case where a high-resolution image or a color image is transmitted from the T.38-based apparatus, when a transmission destination apparatus is directly connected to a high-speed communication line (LAN or NGN), it is possible to achieve high-speed transmission for a small charge. However, when a transmission destination apparatus is a T.30-based apparatus that is not directly connected to a LAN (NGN), transmission is performed at the same transmission speed as the conventional PSTN transmission speed, i.e. at a low speed. As a consequence, the communication line is occupied for a long time period and a high communication charge has to be paid.

SUMMARY CF THE INVENTION

The present invention provides an image communication apparatus which makes it possible to shorten a line occupation time as well as to reduce communication charge, a method of controlling the image communication apparatus, and a storage medium.

In a first aspect of the present invention, there is provided an image communication apparatus including a transmission unit that is connected to a network and performs facsimile transmission of image data to a transmission destination according to session initiation protocol (SIP), comprising a generation unit configured to generate image data for high-speed transmission and image data for low-speed transmission, from input image data, a determination unit configured to determine, before transmission of image data by the transmission unit, whether or not high-speed transmission of the image data is possible, and a selection unit configured to select the image data for high-speed transmission when the determination unit determines that high-speed transmission of the image data is possible, and select the image data for low-speed transmission when the determination unit determines that high-speed transmission of the image data is impossible, wherein the transmission unit transmits image data selected by the selection unit.

In a second aspect of the present invention, there is provided an image communication apparatus including a transmission unit that is connected to a network and performs facsimile transmission of image data to a transmission destination according to session initiation protocol (SIP), comprising a voice communication determination unit configured to determine whether or not transmission of the image data is to be performed by voice communication, wherein when the voice communication determination unit determines that transmission of the image data is to be performed by voice communication, the transmission unit generates smaller-amount image data than the image data from the image data and transmits the generated image data.

In a third aspect of the present invention, there is provided a method of controlling an image communication apparatus including a transmission unit that is connected to a network and performs facsimile transmission of image data to a transmission destination according to session initiation protocol (SIP), comprising generating image data for high-speed transmission and image data for low-speed transmission from input image data, determining, before transmission of image data by the transmission unit, whether or not high-speed transmission of the image data is possible, selecting the image data for high-speed transmission when it is determined that high-speed transmission of the image data is possible, and selecting the image data for low-speed transmission when it is determined that high-speed transmission of the image data is impossible, and transmitting the selected image data.

In a fourth aspect of the present invention, there is provided a method of controlling an image communication apparatus including a transmission unit that is connected to a network and performs facsimile transmission of image data to a transmission destination according to session initiation protocol (SIP), comprising determining whether or not transmission of the image data is to be performed by voice communication, and generating, when it is determined that transmission of the image data is to be performed by voice communication, smaller-amount image data than the image data from the image data, and transmitting the generated image data.

In a fifth aspect of the present invention, there is provided a non-transitory computer-readable storage medium storing a program for causing a computer to execute a method of controlling an image communication apparatus including a transmission unit that is connected to a network and performs facsimile transmission of image data to a transmission destination according to session initiation protocol (SIP), wherein the method comprises generating image data for high-speed transmission and image data for low-speed transmission from input image data, determining, before transmission of image data by the transmission unit, whether or not high-speed transmission of the image data is possible, selecting the image data for high-speed transmission when it is determined that high-speed transmission of the image data is possible, and selecting the image data for low-speed transmission when it is determined that high-speed transmission of the image data is impossible, and transmitting the selected image data.

In a sixth aspect of the present invention, there is provided a non-transitory computer-readable storage medium storing a program for causing a computer to execute a method of controlling an image communication apparatus including a transmission unit that is connected to a network and performs facsimile transmission of image data to a transmission destination according to session initiation protocol (SIP), wherein the method comprises determining whether or not transmission of the image data is to be performed by voice communication, and generating, when it is determined that transmission of the image data is to be performed by voice communication, smaller-amount image data than the image data from the image data, and transmitting the generated image data.

According to the present invention, determination as to the capabilities of a transmission destination apparatus and a transmission path is performed, and when it is determined that transmission is to be performed at a low speed, an image to be transmitted is converted to low-resolution data or monochrome data suitable for low-speed transmission and is then transmitted. This makes it possible to shorten a line occupation time as well as to reduce communication charge.

Further features of the present invention will become apparent from the following description of exemplary embodiments with reference to the attached drawings.

BRIEF DESCRIPTION OF THE DRAWINGS

FIG. 4 is a view showing an example of a digital information signal (DIS).

FIG. 6A is a view showing an example of an INVITE signal exchanged in the SIP connection process in FIG. 5.

FIG. 6B is a view showing an example of a 200 OK signal exchanged in the SIP connection process in FIG. 5.

FIG. 8A is a view showing an example of an INVITE signal exchanged in the SIP connection process in FIG. 7.

FIG. 8B is a view showing an example of a 200 OK signal exchanged in the SIP connection process in FIG. 7.

DESCRIPTION OF THE EMBODIMENTS

The present invention will now be described in detail below with reference to the accompanying drawings showing embodiments thereof.

Figure 1:
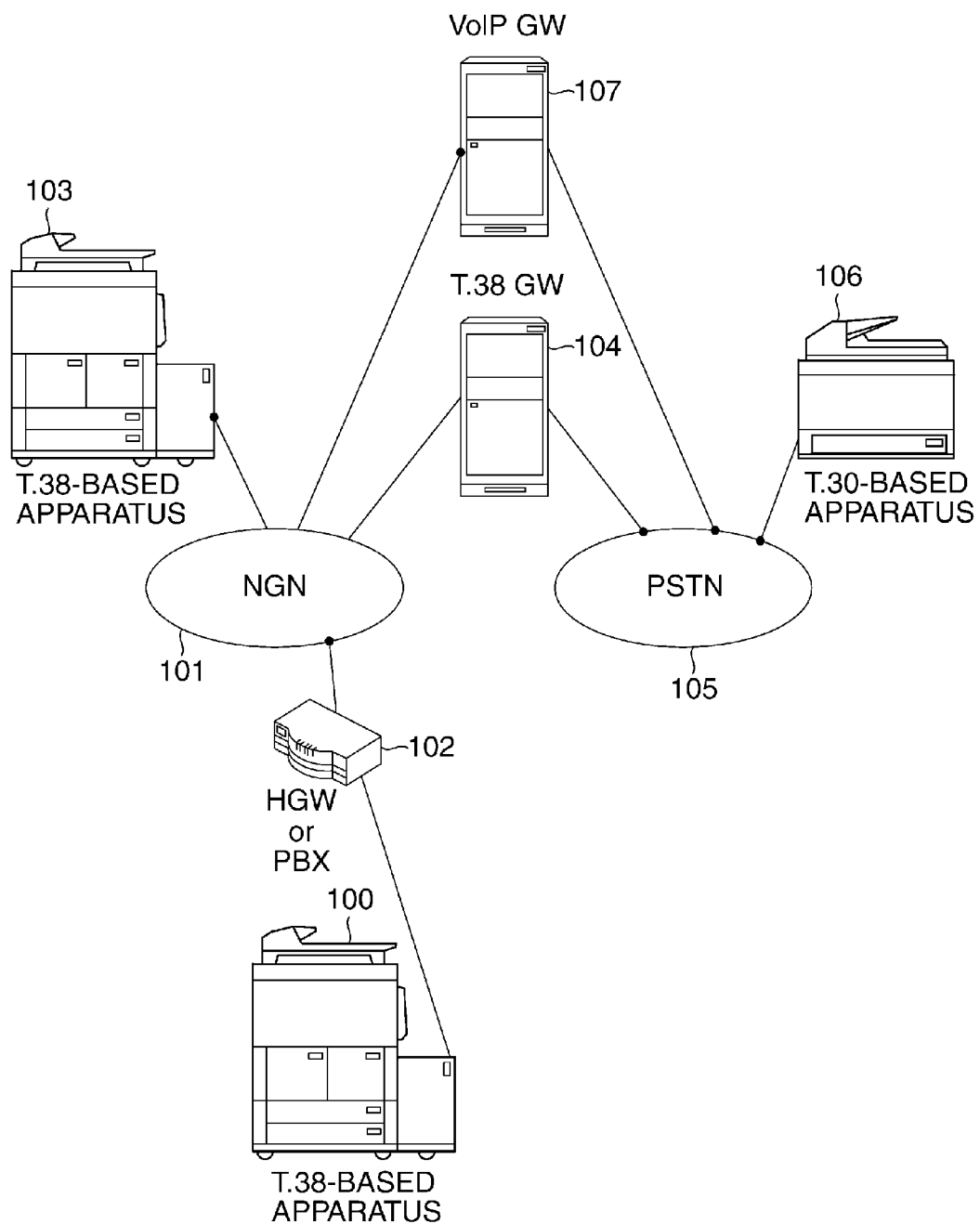
FIG. 1 is a diagram of a network including an image communication apparatus according to a first embodiment of the present invention.

FIG. 1 is a diagram of a network including an image communication apparatus according to a first embodiment of the present invention.

Referring to FIG. 1, the image communication apparatus 100 is a T.38-based apparatus. An NGN 101 is a LAN line, such as a next generation network (NGN). A home gateway (hereinafter abbreviated as "the HGW") 102 is connected to the image communication apparatus 100 and the NGN 101, and is used for interconnection therebetween.

An image communication apparatus 103 is one transmission destination apparatus as a communication partner of the image communication apparatus 100. Similarly to the image communication apparatus 100, the image communication apparatus 103 is a T.38-based apparatus. Communication between the image communication apparatuses 100 and 103 is performed via the HGW 102 and the NGN 101.

In communication between the image communication apparatuses 100 and 103, point-to-point communication is performed using SIP (session initiation protocol) for a call control process prior to facsimile transmission using ITU-T Recommendation T.38. For communication between the image communication apparatuses 100 and 103, only a high-speed line, such as an NGN, is used, so that it is possible to perform communication at a speed of 1 Mbps maximum to thereby achieve high-speed and low-charge communication.

An image communication apparatus 106 is another transmission destination apparatus as another communication partner of the image communication apparatus 100. The image communication apparatus 106 is a T.30-based apparatus. The communication between the image communication apparatuses 100 and 106 is performed as follows: The image communication apparatus 100 is connected to the NGN 101 via the HGW 102. Between the NGN line and a general PSTN (public switched telephone network) 105 is connected a T.38 gateway (GW) 104. The T.38 gateway 104 performs interconversion between a signal based on specifications of T.38 and a signal based on specifications of T.30 as a facsimile communication standard for the PSTN. The T.38 gateway 104 is connected to the image communication apparatus 106 via the PSTN 105.

In the example shown in FIG. 1, high-speed data transmission is possible from the image communication apparatus 100 to the T.38 gateway 104, but since the conventional analog line is used for data transmission from the T.38 gateway 104 to the image communication apparatus 106, the transmission speed cannot exceed 33.6 kbps. Consequently, high-speed transmission is impossible.

Next, a description will be given of a communication method using VoIP (voice over IP) on the network shown in FIG. 1. VoIP is a technique for causing voice packets to be transmitted over a LAN, such as an IP network.

In FIG. 1, a VoIP gateway 107 is used for interconversion between a voice packet on the LAN (NGN 101) side and a voice signal on the PSTN (PSTN 105) side. A VoIP communication on the FIG. 1 network is established between any two of the image communication apparatus 100, the HGW 102, the NGN 101, the VoIP gateway 107, the PSTN 105, and the image communication apparatus 106. In the VoIP communication, a voice signal is transmitted without being processed and therefore transmission is performed at a low speed of 33.6 kbps.

As described above, when a communication partner is a T.38-based apparatus that uses a high-speed line, communication can be performed at a high speed (1 Mbps maximum), whereas when a T.38 gateway or a VoIP gateway is used, communication has to be performed at a low speed (33.6 Kbps maximum). Further, in communication between T.38-based apparatuses, since high-speed transmission can be performed, it is possible to transmit a color image or a hyper-resolution (e.g. 1200 bps×1200 bps) image by facsimile transmission at a high speed for a small charge.

Figure 2:
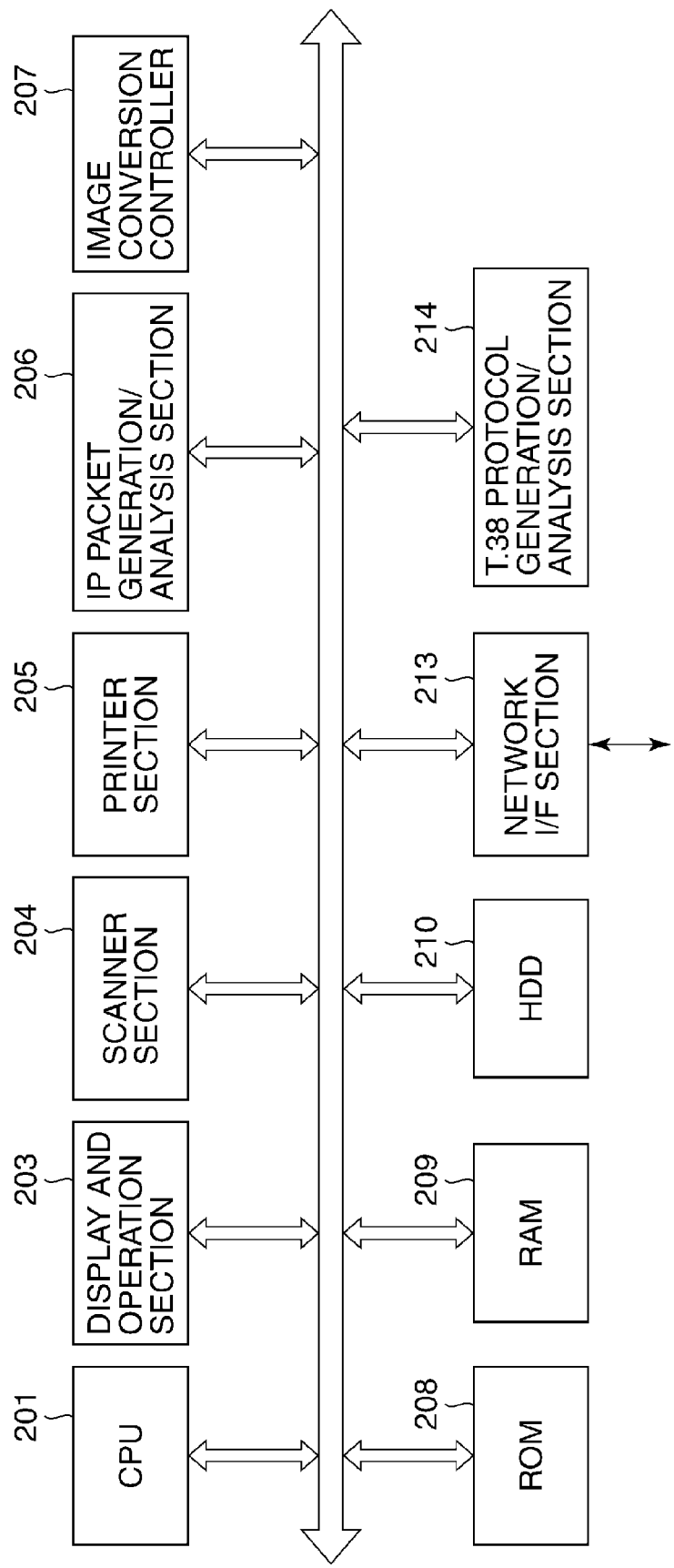
FIG. 2 is a schematic block diagram of the image communication apparatus appearing in FIG. 1.

FIG. 2 is a schematic block diagram of the image communication apparatus 100 appearing in FIG. 1.

In FIG. 2, a CPU 201 controls various devices appearing in FIG. 2, based on control programs stored in a ROM 208. A display and operation section 203 displays e.g. windows, icons, messages, menus, and other user interface information, on a display screen thereof. The display and operation section 203 comprises various kinds of keys, not shown, via which a user performs operations for copying, facsimile transmission, and printing, and a screen pointing device, not shown, with which the user operates an icon, a menu, etc. displayed on the display screen.

A scanner section 204 is provided with a function for reading an image from an original. A printer section 205 prints print data stored in a RAM 209 or a HDD (hard disk drive) 210. The ROM 208 stores various kinds of control programs and data. The RAM 209 is used as a work area in which the CPU 201 temporarily stores data, a data save area for use in error processing, a load area for control programs, and so forth.

The HDD 210 is an external storage device for storing various kinds of control programs and print data. A network interface (I/F) section 213 controls connection of the image communication apparatus 100 to the HGW 102 and the network. Communication using SIP is also performed via the network interface section 213.

A T.38 protocol generation/analysis section 214 has a function for generating facsimile transmission information to be transmitted according to a protocol of ITU-T Recommendation T.38, and a function for analyzing received facsimile transmission information.

An IP packet generation/analysis section 206 has a function for mapping the protocol of ITU-T Recommendation T.38 to IP packets, and a function for extracting the protocol of ITU-T Recommendation T.38 from received IP packets. An image conversion controller 207 performs compression, expansion, zooming, and linear density conversion of images to be transmitted and received by facsimile communication.

Note that the image communication apparatus 103 has the same configuration as the image communication apparatus 100, and hence description thereof is omitted. Further, the image communication apparatus 106 is different from the image communication apparatus 100 only in that a protocol of ITU-T Recommendation T.30 is used in place of ITU-T Recommendation T.38 protocol, and hence description of the configuration thereof is also omitted.

Next, a description will be given of a facsimile transmission process performed by the image communication apparatus 100.

Figure 3:
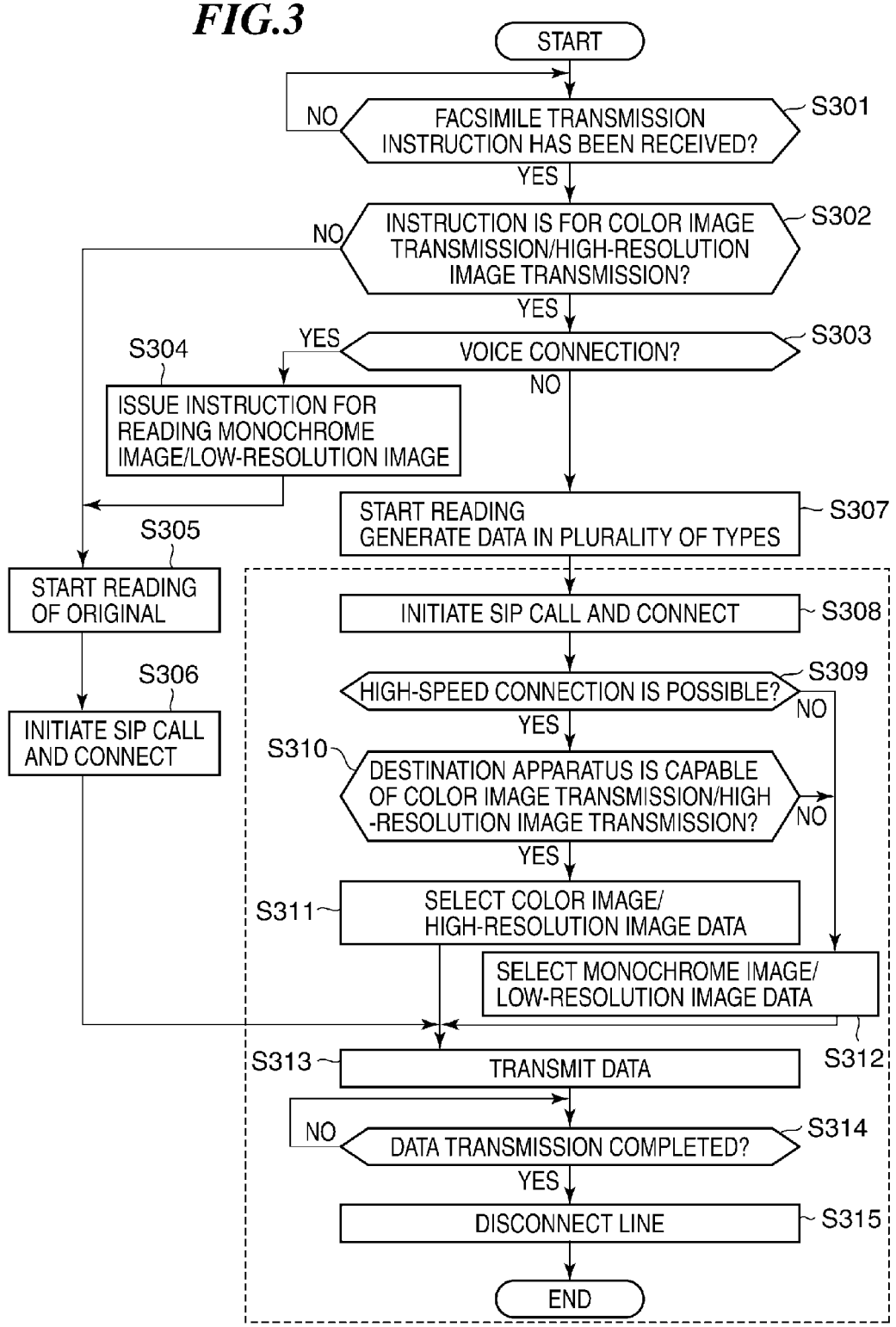
FIG. 3 is a flowchart of a facsimile transmission process executed by the image communication apparatus.

FIG. 3 is a flowchart of the facsimile transmission process executed by the image communication apparatus 100.

First, the CPU 201 determines in a step S301 whether or not a facsimile transmission instruction has been received from the user via the display and operation section 203. If it is determined that the facsimile transmission instruction has been received, the CPU 201 proceeds to a step S302, wherein the CPU 201 determines whether or not in the received facsimile transmission instruction, facsimile transmission of a color image or a hyper-resolution image of more than 600 dpi has been designated. If it is determined that facsimile transmission of a color image or a hyper-resolution image of more than 600 dpi has not been designated, the CPU 201 proceeds to a step S305. On the other hand, if it is determined that facsimile transmission of a color image or a hyper-resolution image of more than 600 dpi has been designated, the CPU 201 proceeds to a step S303.

In the step S305, the CPU 201 causes the scanner section 204 to perform normal reading of an image from an original. Then, the CPU 201 performs connection call by a SIP connection process to thereby initiate a call and connect to a transmission destination (step S306), and then transmits data (step S313). When the data transmission is completed (YES to a step S314), the CPU 201 causes the network interface section 213 to perform line disconnection (step S315). Normal facsimile transmission using ITU-T Recommendation T.38 is performed through the above-described processing.

In the step S303, the CPU 201 determines a transmission mode to be used. The transmission mode in the present embodiment comprises a T.38 transmission mode in which transmission is performed by a procedure defined in T.38 and a VoIP transmission mode in which transmission is performed by voice communication using VoIP. Selection of a transmission mode between the T.38 transmission mode and the VoIP transmission mode is performed in advance by a user or is automatically performed by judgment based on a telephone number to which a call is initiated. The case of selection of a transmission mode by the user is a case of selection of a communication mode, which is executed e.g. by selecting between a communication mode defined in T.38 in advance and a communication mode based on voice. On the other hand, in the case of automatically determining a transmission mode based on a telephone number, it is determined whether or not the telephone number has an area code (e.g. 03, 06, or the like in Japan) generally used on the PSTN, and if the telephone number is determined to be a PSTN number, it is automatically determined that the communication mode is the communication mode based on voice, based on which the VoIP transmission mode is selected.

If it is determined in the step S303 that the transmission mode to be used is not the VoIP transmission mode, the CPU 201 proceeds to a step S307. On the other hand, if it is determined that the transmission mode to be used is the VoIP transmission mode, high-speed transmission is not possible, and therefore the CPU 201 instructs the scanner section 204 to perform image reading in monochrome or in low resolution (step S304), and then, the step 305 et seq. are executed. Thus, in VoIP transmission, even when facsimile transmission of a color image or a hyper-resolution image is designated before execution of facsimile transmission, reading of a monochrome image or a low-resolution image is performed. That is, when it is determined that transmission is to be performed at a low speed, an image to be transmitted is converted to a monochrome or low-resolution image suitable for low-speed transmission and is then transmitted. This makes it possible to shorten a line occupation time as well as to reduce communication charge.

If facsimile transmission of a color image or a hyper-resolution image is designated and when the transmission mode to be used is not the VoIP transmission mode, the step S307 et seq. steps are executed. In this case, in the illustrated example, a possible communication partner of the image communication apparatus 100 is the T.38-based apparatus (image communication apparatus 103) to which the image communication apparatus 100 is connected via the HGW 102 and the NGN 101 or the T.30-based apparatus (image communication apparatus 106) to which the image communication apparatus 100 is connected via the HGW 102 and the NGN 101 and further via the T.38 gateway 104 and the PSTN 105.

In the step S307, the following processing is executed. The CPU 201 cannot determine whether or not high-speed transmission to a transmission destination is possible, until a call connection is made. Therefore, the CPU 201 causes the T.38 protocol generation/analysis section 214 to generate two kinds of image data, i.e. image data for high-speed transmission and image data for low-speed transmission, based on input image data. This is because if image conversion is performed after establishment of connection to a transmission destination apparatus, it takes time to complete the image conversion and hence it is impossible to guarantee real-time transmission. For example, when color image transmission has been designated, the CPU 201 causes the scanner section 204 to generate not only a color image but also a monochrome image from an original. Similarly, when hyper-resolution image transmission has been designated, the CPU 201 causes the scanner section 204 to generate not only an image of hyper resolution (e.g. 1200×1200 dpi) but also an image of a low resolution (e.g. 400×400 dpi) from an original.

Then, in a step S308, the CPU 201 performs call connection using the SIP connection process. The method of call connection using the SIP connection process will be described hereinafter.

Then, in a step S309, it is determined, based on the call connection established in the step S308, whether or not high-speed connection to the transmission destination apparatus is possible. Whether or not high-speed connection is possible can be determined based on a digital information signal (DIS) in T.38 (or T.30) connection processing. Information on the capabilities of the transmission destination apparatus is sent by a T.38 (or T.30) DIS from a recipient apparatus. FIG. 4 shows an example of the contents of the DIS. As shown in FIG. 4, the DIS is formed by bit strings, and each of the bit strings is assigned a function. For example, bit 3 (third bit) is indicative of a T.38 capability. When the bit 3 has a value of 1, it is determined that the recipient apparatus is a T.38-based apparatus.

In the step S309, the CPU 201 determines whether or not the bit 3 of the received DIS is equal to 1 to thereby determine whether or not high-speed connection is possible. If it is determined that high-speed connection is possible, the CPU 201 proceeds to a step S310. On the other hand, if it is determined that high-speed connection is impossible, the CPU 201 proceeds to a step S312.

In the step S310, the CPU 201 determines the capabilities of the transmission destination apparatus based on the DIS. In general, when a function is extended, it is possible to extend a field of the DIS using an identification bit. By performing the function extension, information on the capability of transmission of a color image data or a hyper-resolution image of 600 dpi or higher is exchanged using the DIS. In FIG. 4, extended fields of bit 64 (64th bit) et seq. are used as information on transmission of color image data, and bit 69 (69th bit) is indicative of whether or not a color image receiving function is provided. If the bit 69 is equal to 1, it is determined that the color transmission capability is provided.

Further, recently, the DIS has been configured to enable resolution extension. Conventionally, an image for facsimile transmission can have one of four resolutions, i.e. 100×200 dpi, 200×200 dpi, 200×400 dpi, and 400×400 dpi. On the other hand, the use of the DIS makes it possible to select between resolutions from 600 dpi to 1200 dpi using extended fields of bit 104 (104th bit) et seq. of the DIS.

If it is determined in the step S310 that the transmission destination apparatus is capable of transmitting a color image or a hyper-resolution image, the CPU 201 proceeds to a step S311. On the other hand, if it is determined that the transmission destination apparatus is not capable of transmitting a color image or a hyper-resolution image, the step S312 et seq. are executed. That is, even if a sender has designated transmission of a color image or a hyper-resolution image, it is impossible to transmit the image to a transmission destination apparatus incapable of transmission of a color image or a hyper-resolution image.

In the step S311, the CPU 201 selects the image data for high-speed transmission (i.e. a color image or a hyper-resolution image), which was generated in the step S307, and transmits the selected image data (step S313). When the data transmission is completed (YES to the step S314), the CPU 201 causes the network interface section 213 to disconnect the line (step S315). Thus, when high-speed transmission is possible between the communication apparatus 100 and a transmission destination apparatus, the image data for high-speed transmission (i.e. a color image or a hyper-resolution image) generated in advance is selected, so that it is possible to perform facsimile transmission at a high speed for a small charge.

On the other hand, in the step S312, the CPU 201 selects the image data for low-speed transmission (i.e. a monochrome image or a low-resolution image), which was generated in the step S307, and transmits the selected image data in the step S313.

As described above, according to the present embodiment, a plurality of images (color or monochrome image and hyper-resolution or low-resolution images) are generated in advance in preparation for possibility of low-speed transmission, and after determining whether or not high-speed transmission is possible based on a transmission path and the capabilities of a transmission destination apparatus, one of the generated image is selected and transmitted. Consequently, in a case where only low-speed transmission is possible due to restriction of a communication path or the capabilities of a transmission destination apparatus, an image with a small data amount is transmitted, whereby it is possible to prevent the line from being occupied and to suppress a communication charge from being increased.

Next, a description will be given of a second embodiment of the present invention.

The second embodiment is distinguished from the above-described first embodiment only by a method of determining a transmission path (capabilities of a transmission destination apparatus) in the step S309 in FIG. 3. Therefore, the same elements as those in the first embodiment are denoted by the same reference numerals, and description thereof is omitted.

In the determination method in the step S309 in the second embodiment, determination is performed not based on a T.38 (or T.30) DIS (digital information signal), but based on information from a signal in a SIP connection process.

First, a description will be given of the SIP connection process.

Figure 5:
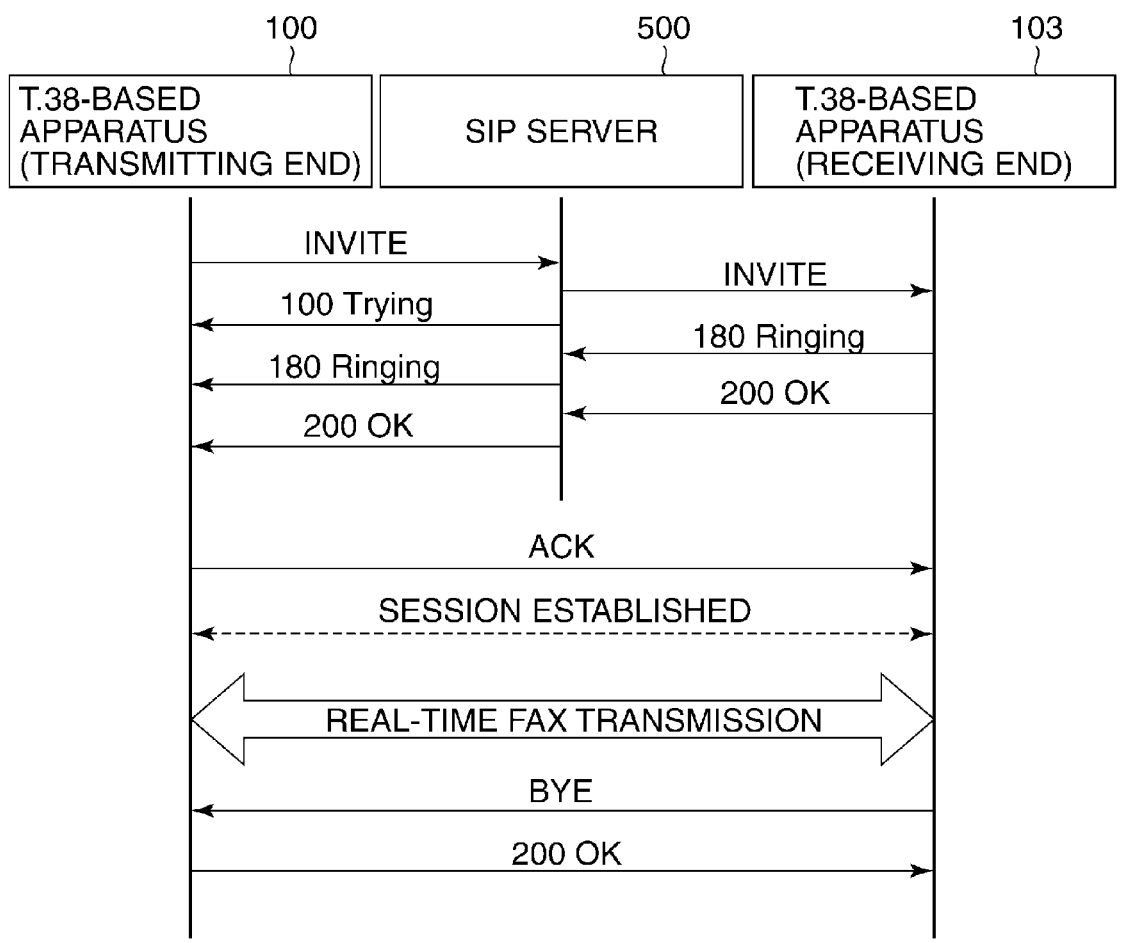
FIG. 5 is a sequence diagram showing an example of a SIP connection process executed by an image communication apparatus according to a second embodiment of the present invention, when a transmission destination apparatus is directly connected to a high-speed transmission path such as an NGN.

FIG. 5 is a sequence diagram showing an example of a SIP connection process executed when a transmission destination apparatus is directly connected to a high-speed transmission path, such as an NGN.

As shown in FIG. 5, between the image communication apparatus 100 (T.38-based apparatus) and the image communication apparatus 103 (T.38-based apparatus), there is disposed a SIP server 500 for enabling exchange of signals between the apparatuses for the SIP connection process. The SIP server 500 is disposed e.g. at the HGW 102 or the NGN 101 appearing in FIG. 1, and is provided so as to perform address resolution (i.e. to derive the IP address of a transmission destination apparatus e.g. from a telephone number) in the SIP connection process.

Initiation of a call is performed using a signal called INVITE in the SIP connection process. The SIP server 500 having received the INVITE signal from the image communication apparatus 100 acquires the IP address of a transmission destination apparatus (the image communication apparatus 103 in the present example) from the telephone number or the like of the transmission destination apparatus contained in the signal. Then, the SIP server 500 sends a 100 Trying signal indicating that the call is in progress to the image communication apparatus 100.

Then, the SIP server 500 notifies the image communication apparatus 103 as the transmission destination apparatus, using the INVITE signal, that an incoming call has been received. The image communication apparatus 103 having received the INVITE signal sends a 180 Ringing signal indicative of ringing to the SIP server 500. The SIP server 500 transfers the 180 Ringing signal to the image communication apparatus 100.

Next, after accepting the incoming call, the image communication apparatus 103 sends a 200 OK signal to the SIP server 500. The SIP server 500 transfers the received signal to the image communication apparatus 100.

Through the above-described sequential operations, a call is established between the image communication apparatuses 100 and 103, and IP addresses of the respective image communication apparatuses 100 and 103 are determined. Thereafter, a session is established between the image communication apparatuses 100 and 103 in a point-to-point manner, and real-time facsimile transmission is performed by T.38 connection processing.

When the facsimile transmission is completed, the call established by the SIP connection process is disconnected using a BYE signal. The image communication apparatus 100 having received the signal sends the 200 OK signal to the image communication apparatus 103, whereby the call is disconnected.

FIGS. 6A and 6B show examples of the INVITE signal and the 200 OK signal as a reply signal to the INVITE signal, which are exchanged in the SIP connection process.

FIG. 6A shows the example of the INVITE signal, and a signal name is indicated in its leading line of character strings. A recipient (To) and a sender (From) are specified in the following character strings. In the INVITE signal, a portion starting with "V=0" is called SDP (session description protocol), and shows more detailed information on the signal.

A parameter starting with "o=" indicates an originator (session originator). In the example in FIG. 6B, the parameter "o=" indicates the transmission destination apparatus, i.e. the image communication apparatus 103.

Figure 7:
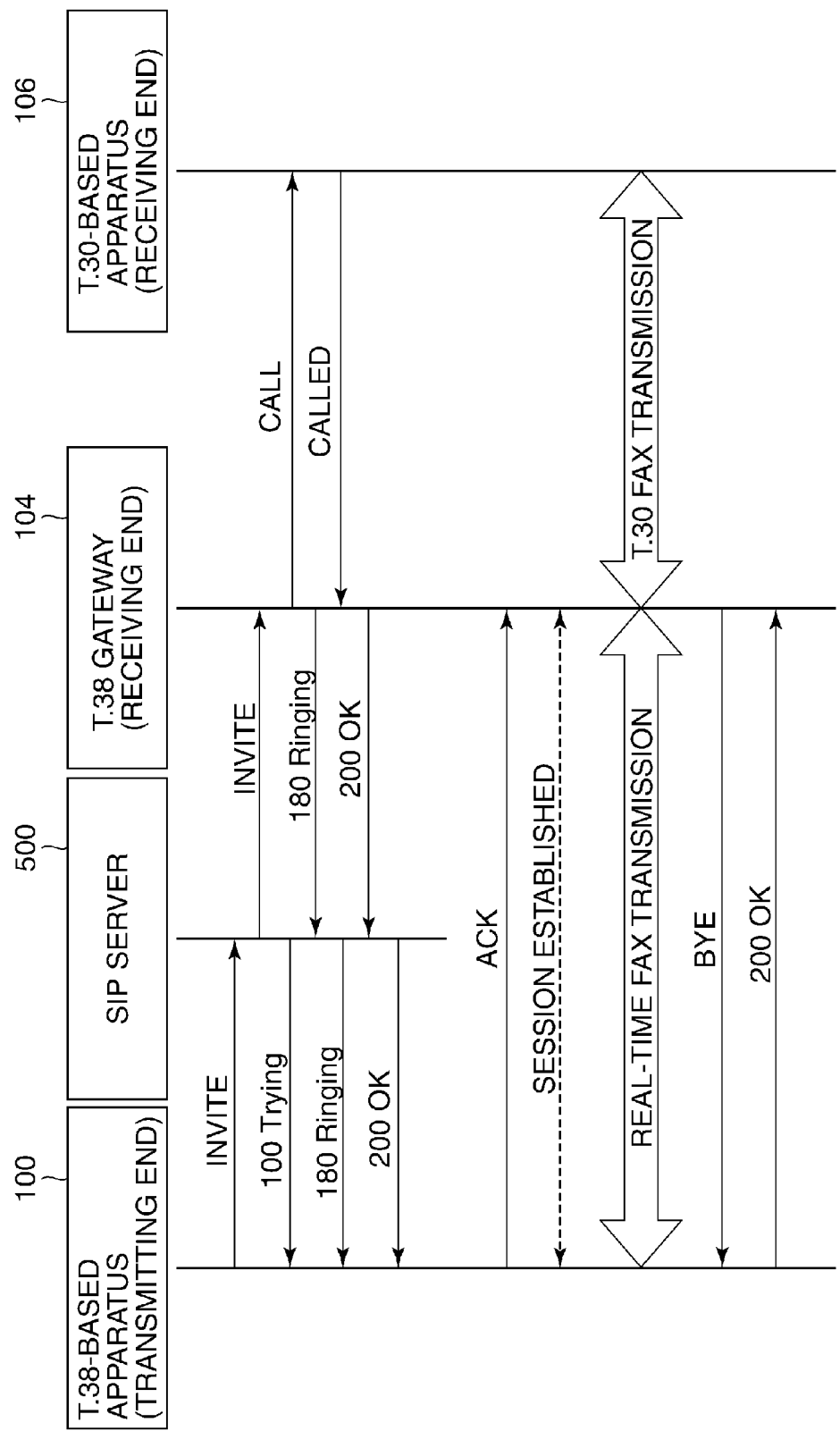
FIG. 7 is a sequence diagram showing an example of a SIP connection process executed in a case where a transmission destination apparatus is a T.30-based apparatus and low-speed transmission is performed via a T.38 gateway.

FIG. 7 is a sequence diagram showing an example of a SIP connection process executed in a case where the image communication apparatus 106 as a T.30-based apparatus is a transmission destination apparatus and low-speed transmission is to be performed via the T.38 gateway 104.

It is assumed that the image communication apparatus 100 (T.38-based apparatus) is connected to the image communication apparatus 106 (T.30-based apparatus) via a communication path formed by the HGW 102, the NGN 101, the T.38 gateway 104, and the PSTN 105, in FIG. 1. In this case, a call connection process by SIP is performed between the image communication apparatus 100, the SIP server 500, and the T.38 gateway 104. Since the T.38 gateway 104, the PSTN 105, and the image communication apparatus 106 are connected by the conventional analog line, the SIP connection process is converted to the PSTN call connection process by the T.38 gateway 104. More specifically, the INVITE signal for the SIP connection process is converted to a PSTN call signal by the T.38 gateway 104, and is then sent to the image communication apparatus 106. When the image communication apparatus 106 responds to this, the T.38 gateway 104 detects an incoming signal from the image communication apparatus 106, converts the signal to the 200 OK signal for the SIP connection process, and then transmits the 200 OK signal to the SIP server 500. When a call is established through the above-described process, a session is established between the image communication apparatus 100 and the T.38 gateway 104, whereby real-time communication by T.38 is performed between the image communication apparatus 100 and the T.38 gateway 104. In doing this, the T.38 gateway 104 performs conversion of a T.38 procedure signal and a T.30 procedure signal, alternately.

The T.38 gateway 104 and the image communication apparatus 106 are connected to each other by a conventional T.30 procedure. The signal speed therebetween is 33.6 kbps maximum.

FIGS. 8A and 8B show examples of the INVITE signal and the 200 OK signal as a reply signal to the INVITE signal, which are exchanged in the SIP connection process.

FIG. 8A shows the example of the INVITE signal, and FIG. 8B shows the example of the 200 OK signal. For the most part, these signals each have the same general configuration as the corresponding one of the signals exemplified in FIGS. 6A and 6B, and therefore description thereof is omitted.

A character string starting with "o=" indicative of an originator (session originator) in the SDP (contents from "v=0) of the 200 OK signal indicates an apparatus as a converter of the SIP connection process. In FIG. 6B, the originator corresponds to a recipient apparatus, but in FIG. 8B, since conversion of the SIP connection process is performed by the T.38 gateway 104, the character string at "o=" contains information indicative of the fact ("C-T38GateWay" in the present example). Determination as to a communication path can be performed by analyzing a signal contained in the character string at "o=".

Thus, it is possible to determine a communication path (i.e. whether or not high-speed communication is possible) based on information of the SIP signal as a call connection process signal.

Figure 9:
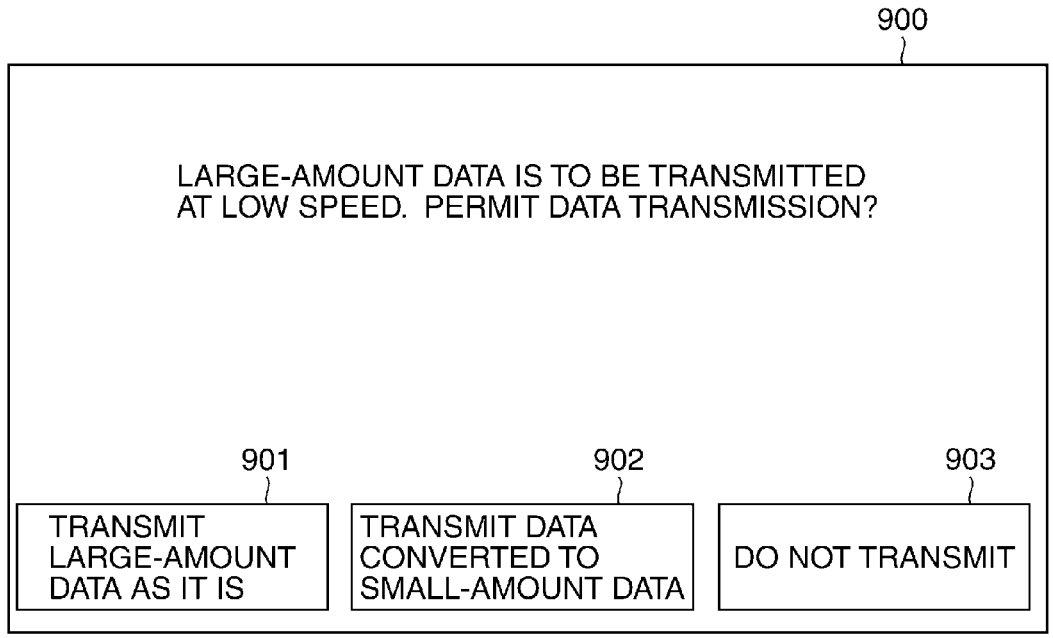
FIG. 9 is a view showing an example of a transmission operation selection screen displayed on a display and operation section of an image communication apparatus according to a third embodiment of the present invention.
Figure 10:
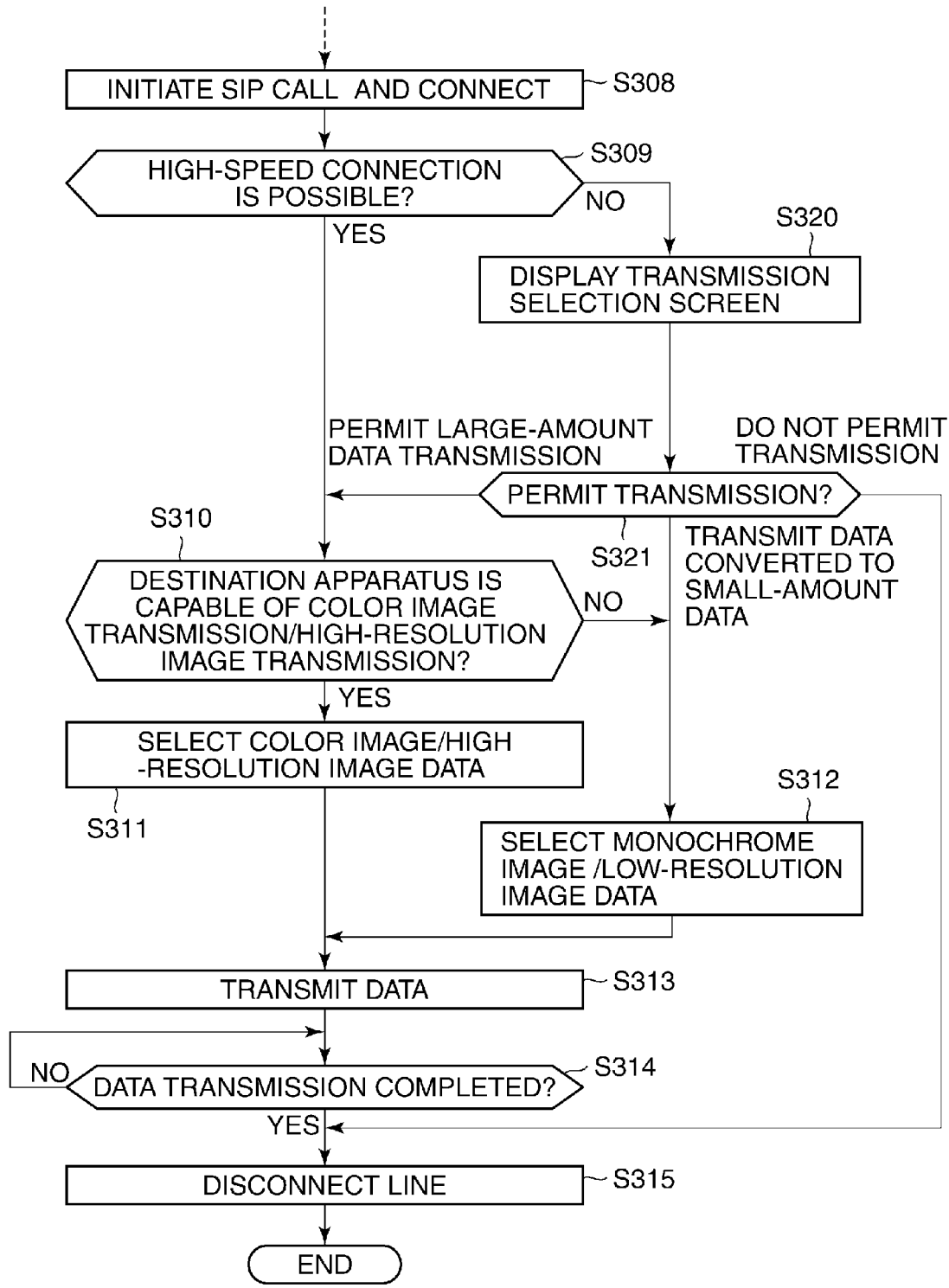
FIG. 10 is a flowchart of a facsimile transmission process executed by the image communication apparatus according to the third embodiment.

Although in the above-described embodiment, an image to be transmitted is selected based on whether or not high-speed communication is possible, this selection may be performed by a user. For example, a step of processing for displaying a screen 900 illustrated in FIG. 9, on the display and operation section 203, may be additionally provided immediately before the step S312 in FIG. 3 so as to notify the user that large-amount image data is to be transmitted at a low speed. The screen 900 may be configured, as shown in FIG. 9, such that the user can select one of options "transmit large-amount data as it is" 901, "transmit data converted to small-amount data" 902, and "do not transmit" 903. FIG. 10 shows the flow of a process executed in this case. The same elements as those in the first embodiment are denoted by the same reference numerals, and description thereof is omitted.

FIG. 10 is a flowchart of a facsimile transmission process executed by the image communication apparatus 100 according to a third embodiment of the invention. In the flowchart in FIG. 10, the same steps prior to the step S308 as those in FIG. 3 are omitted, and only the step S308 et seq. are shown.

In the step S308, the CPU 201 initiates a call and performs call connection by the SIP connection process. Then, in the step S309, the CPU 201 determines, based on the call connection established in the step S308, whether or not high-speed connection to the transmission destination apparatus is possible. If it is determined that high-speed connection is possible, the CPU 201 proceeds to the step S310 et seq.

On the other hand, if it is determined in the step S309 that high-speed connection is impossible, the CPU 201 displays the screen 900 illustrated in FIG. 9, on the display and operation section 203 (step S320) and prompts the user to select a transmission operation to be performed thereafter. If the user selects transmission of large-amount data (i.e. the option "transmit large-amount data as it is" 901) in a step S321, the step S310 et seq. are executed. In other words, if the transmission destination apparatus is capable of transmission of large-amount data (YES to the step S310), the large-amount data is transmitted immediately.

On the other hand, if the user selects transmission of image data converted to small-amount data (i.e. the option "transmit data converted to small-amount data" 902) in the step S321, the CPU 201 proceeds to the step S312, wherein the image data for low-speed transmission (i.e. the monochrome image or the low-resolution image), which was generated in the step S307, is transmitted.

Further, if the user selects not to transmit the data (i.e. selects the option "do not transmit" 902) in the step S321, the CPU 201 proceeds to the step S315, and the line is disconnected, followed by terminating the process.

Besides the above-described method of prompting the user to select an operation in real time before execution of facsimile transmission, it is possible to employ a method of prompting the user to configure settings in advance.

Figure 11A:
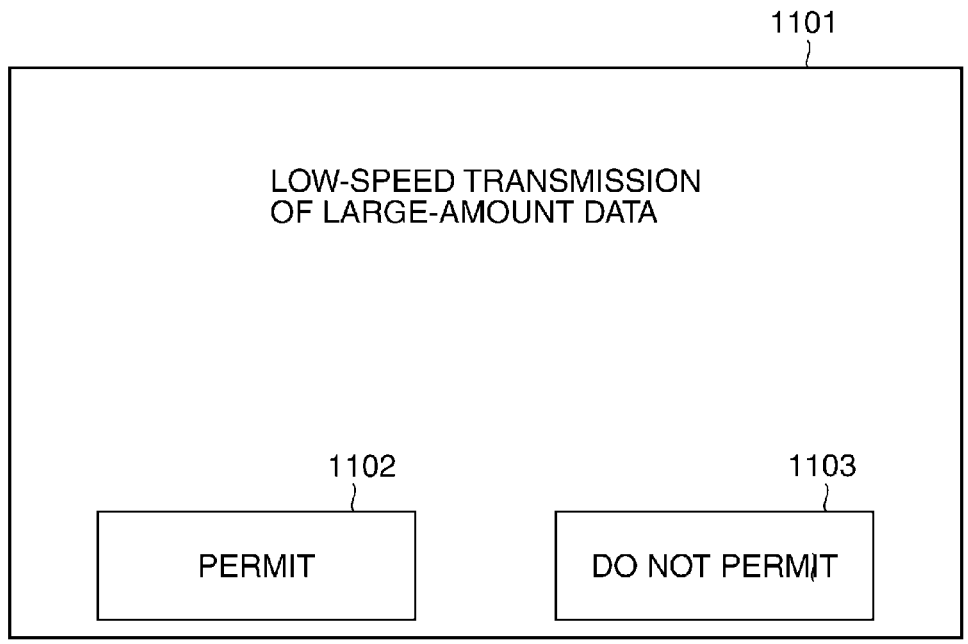
FIG. 11A is a view showing an example of a user's configuration screen displayed on the display and operation section.

For example, the CPU 201 may display a user's configuration screen 1101 illustrated in FIG. 11A on the display and operation section 203 and causes the user to select whether to "permit" or "do not permit" low-speed transmission of large-amount data. If the option "permit" 1102 is selected on the user's configuration screen 1101, low-speed transmission of large-amount data is performed without making an inquiry to the user before the start of the transmission.

Figure 11B:
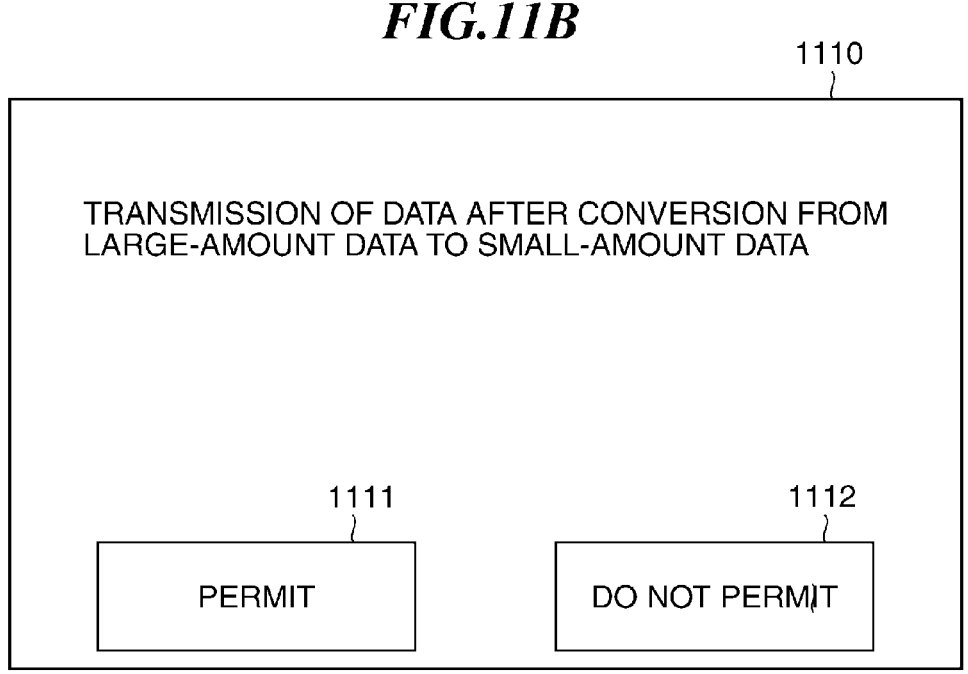
FIG. 11B is a view showing an example of a transition screen displayed when an option "do not permit" is selected on the user's configuration screen.

On the other hand, if the option "do not permit" 1103 is selected, the user's configuration screen 1101 transitions to a screen 1110 illustrated in FIG. 11B, and the CPU 201 prompts the user to select whether to "permit" or "do not permit" processing for converting the large-amount data to small-amount data and then transmitting the small-amount data. If the option "permit" 1111 is selected on the screen 1110, not the large-amount data (color image data or hyper-resolution image data), but the small-amount data (monochrome image data or low-resolution image data) is selected and transmitted. On the other hand, if the option "do not permit" 1112 is selected, data transmission is not performed. Thus, the user can configure an actual transmission operation, which makes it possible to specify the operation in a more detailed manner.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2011-095913 filed Apr. 22, 2011, which is hereby incorporated by reference herein in its entirety.

What is claimed is:

1. An image communication apparatus which is able to perform facsimile transmission of image data to a transmission destination according to session initiation protocol (SIP), comprising:
    an inputting unit configured to input image data;
    a generation unit configured to generate both of image data for high-speed transmission and image data for low-speed transmission, based on the image data input by the inputting unit;

a performing unit configured to perform a call connection according to session initiation protocol after the generation unit generates both of the image data for high-speed transmission and the image data for low-speed transmission;

a determination unit configured to determine whether or not high-speed transmission of the image data is possible after the performing unit performs the call connection;

a selection unit configured to select the image data for high-speed transmission when said determination unit determines that high-speed transmission of the image data is possible, and select the image data for low-speed transmission when said determination unit determines that high-speed transmission of the image data is impossible; and a transmission unit configured to perform facsimile transmission of image data selected by said selection unit, wherein said inputting unit, said generation unit, said performing unit, said determination unit, said selection unit, and said transmission unit are implemented by a processor and a memory.

2. The image communication apparatus according to claim 1, wherein said determination unit performs determination based on a digital information signal (DIS) exchanged in real-time facsimile communication specified in ITU-T Recommendation T.38.

3. The image communication apparatus according to claim 1, wherein said determination unit performs determination based on information on a communication partner, which is exchanged according to a SIP-based call control procedure.

4. The image communication apparatus according to claim 1, wherein said generation unit generates large-amount image data, including color image data and high-resolution image data, as image data for high-speed transmission, and small-amount image data, including monochrome image data and low-resolution image data, as image data for low-speed transmission, and wherein said selection unit selects the large-amount image data when said determination unit determines that high-speed transmission of the image data is possible, and selects the small-amount image data when said determination unit determines that high-speed transmission of the image data is impossible.

5. Then image communication apparatus according to claim 1, further comprising a second selection unit configured to be operable when said determination unit determines that high-speed transmission of the image data is impossible, to prompt a user to select a transmission operation to be performed by said transmission unit, before transmission of the image data is started, wherein said transmission unit performs facsimile transmission according to a result of selection by said second selection unit, and wherein said second selection unit is implemented by the processor and the memory.

6. The image communication apparatus according to claim 1, further comprising a third selection unit configured to prompt a user to select, in advance, a transmission operation to be performed by said transmission unit when said determination unit determines that high-speed transmission of the image data is impossible, wherein said transmission unit performs facsimile transmission according to a result of selection by said third selection unit, and wherein said third selection unit is implemented by the processor and the memory.

7. The image communication apparatus according to claim 6, wherein said third selection unit prompts the user to select whether to transmit large-amount data at a low speed, or to convert the large-amount data to small-amount data and then transmit the small-amount data, or not to transmit data.

8. A method of controlling an image communication apparatus including a transmission unit that is connected to a network and performs facsimile transmission of image data to a transmission destination according to session initiation protocol (SIP), comprising:

inputting image data;

generating both of image data for high-speed transmission and image data for low-speed transmission, based on the input image data;

performing a call connection according to the session initiation protocol after both of the image data for high-speed transmission and the image data for low-speed transmission are generated;

determining whether or not high-speed transmission of the image data is possible after the call connection is performed;

selecting the image data for high-speed transmission when it is determined that high-speed transmission of the image data is possible, and selecting the image data for low-speed transmission when it is determined that high-speed transmission of the image data is impossible; and performing facsimile transmission of the selected image data.

9. A non-transitory computer-readable storage medium storing a program for causing a computer to execute a method of controlling an image communication apparatus including a transmission unit that is connected to a network and performs facsimile transmission of image data to a transmission destination according to session initiation protocol (SIP), wherein the method comprises:

inputting image data;

generating both of image data for high-speed transmission and image data for low-speed transmission, based on the input image data;

performing a call connection according to the session initiation protocol after both of the image data for high-speed transmission and the image data for low-speed transmission are generated;

determining whether or not high-speed transmission of the image data is possible after the call connection is performed;

selecting the image data for high-speed transmission when it is determined that high-speed transmission of the image data is possible, and selecting the image data for low-speed transmission when it is determined that high-speed transmission of the image data is impossible; and performing facsimile transmission of the selected image data.

* * * * *